Sept. 3, 1929.   C. E. GOOD   1,726,736
FLOAT
Filed July 27, 1928
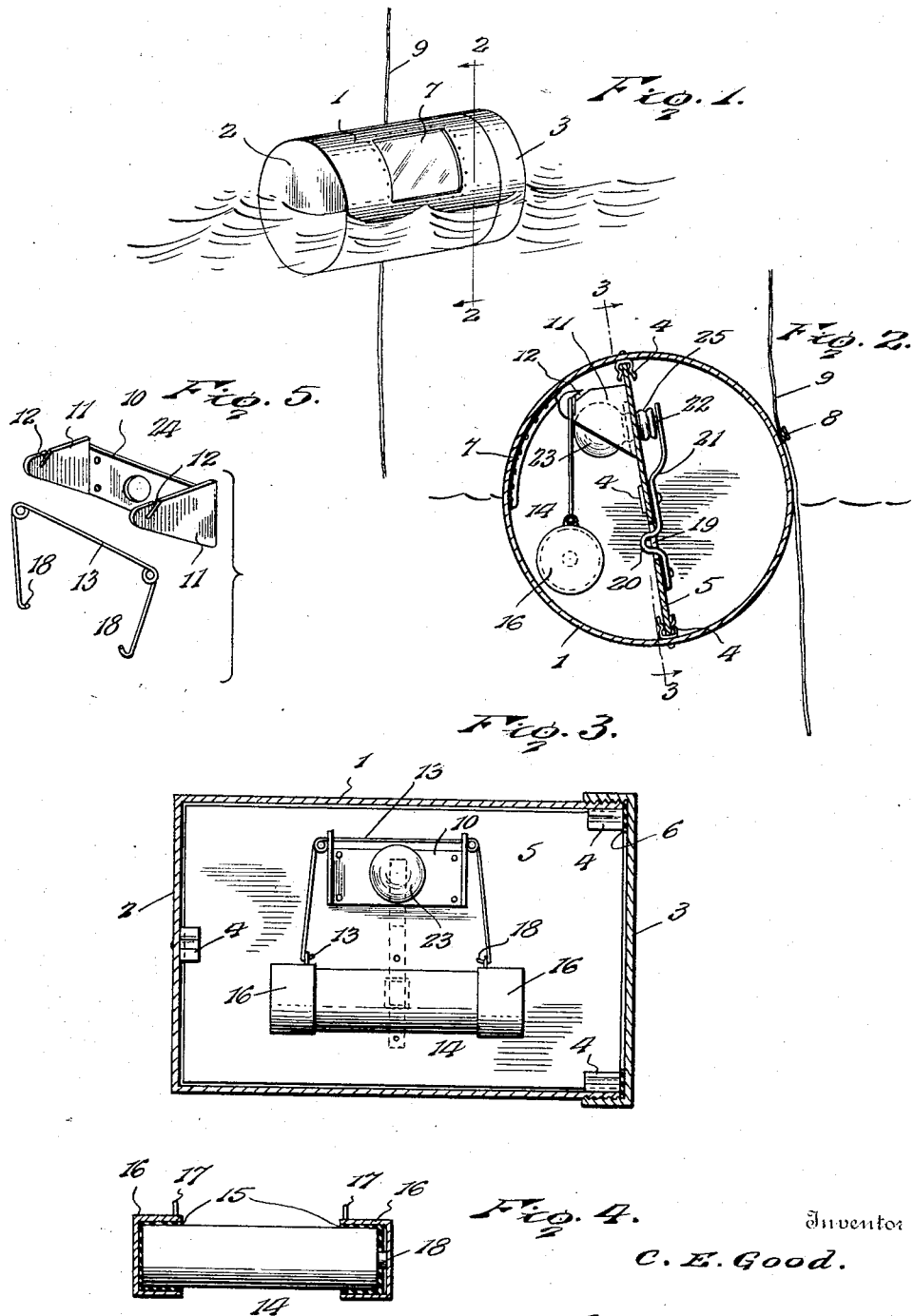
Inventor
C. E. Good.
By Lacey & Lacey, Attorneys Patented Sept. 3, 1929.

1,726,736

UNITED STATES PATENT OFFICE.

CECIL E. GOOD, OF WICHITA, KANSAS.

FLOAT.

Application filed July 27, 1928. Serial No. 295,781.

This invention is a float for fishing lines and has for its object the provision of a simple and inexpensive float which may be attached to a fishing line and which will be operable to signal the catching of a fish. The invention provides a float or container attachable to a fishing line and in which are mounted means for closing an electric circuit and energizing a lamp which will flash a signal through a window provided in the side of the float adjacent the lamp. The invention is illustrated in the accompanying drawing and will be hereinafter first fully described and then more particularly defined in the appended claims.

In the drawing:

Figure 1 is a perspective view of a float embodying my invention;

Fig. 2 is a transverse section of the same on the line 2—2 of Fig. 1;

Fig. 3 is a longitudinal section on the line 3—3 of Fig. 2;

Fig. 4 is a detail sectional elevation of the battery, and

Fig. 5 is a detail perspective view of the means whereby the battery is supported.

In carrying out the invention, there is provided a cylindrical container 1 which will preferably be constructed of aluminum or other light non-corrodible metal. This container has one end permanently closed by a disk or head 2 formed integral with the side wall of the container and at its other end is externally threaded to receive a cap 3. Brackets 4 are provided within the container on a diameter of the same to receive and support a partition 5 of fiber or other insulating material, and this partition is slidable into engagement with the brackets or holding lugs 4, as will be understood. All the working parts of the signal mechanism are mounted upon this partition 5 and after it is inserted in the container the cap 3 is threaded onto the open end thereof to entirely close the container, a gasket 6 being placed between the edge of the container and the cap, as shown in Fig. 3, so that leakage will be prevented. In the side of the container is a glazed opening or window 7 which may be packed in any convenient or approved manner so as to prevent the leakage of water into the container. Upon the exterior of the container is a stud or lug 8 of any convenient form whereby the container may be attached to the fishing line, indicated at 9, and this attaching element is so located that the weight of the parts carried by the partition 5 will cause the same to assume the inclined position shown in Fig. 2 with the window 7 at or above the surface of the water.

Firmly secured upon the partition and at the upper part of the side thereof presented to the window is a bracket 10 of metal having suspending arms 11 at its ends, notches 12 being formed in the upper edges of said arms to receive the cross member 13 of a spring bail by which the battery 14 is suspended. The battery is of the well-known storage type employed in flashlights and has caps 15 of insulation fitted about its ends. Over the insulation caps are metal caps 16 which fit tightly thereon and are provided with eyes 17 in which the hooks 18 at the ends of the spring bail are engaged, it being noted that one cap 16 is in contact with the terminal 18 of the inner battery element. An opening 19 is formed through the partition 5 to accommodate a projection 20 on a spring arm 21 which constitutes a circuit closer and is secured upon the partition below the said opening so that the projection 20 will extend through the opening, as shown in Fig. 2. The upper free end of this circuit-closing element or spring arm is in contact with the center terminal 22 of a lamp bulb 23 which is mounted in a central opening 24 through the base of the bracket 10 and the partition, as will be understood. The rim terminal 25 of the bulb makes contact with the metal bracket so that current may flow therethrough.

In the inactive position shown in Fig. 2, the battery will be suspended away from the partition and the projection 20 of the terminal 21. When a fish is caught, the additional strain placed upon the hook and the line will exert a pull upon the attaching lug or stud 8 so that the float will be turned about its own longitudinal axis and the battery will then swing toward the partition, and the projection 20 will be engaged by the outside element of the battery. A circuit will then be closed running from the battery terminal 18, the adjacent metal cap 16, the side arm of the suspending bail and the bracket 10 to the rim terminal of the lamp. The current then passes through the lamp to the center terminal thereof and through the spring arm 21 and the projection 20 of the same to the outside terminal of the battery, completing the circuit and energizing the lamp to that a light will be flashed through the window 7 of the float. The fisherman will thus be notified of a catch and may haul in the line.

My device is exceedingly simple and may be produced at a low cost. All of the working parts are enclosed so that they will not be affected by the water and they operate in a highly efficient manner to signal a catch. Should a lamp be burnt out, the entire working mechanism may be withdrawn from the container by merely sliding the partition out through the open end of the container, all the parts being thus rendered accessible.

Having thus described the invention, I claim:

1. A fishing float comprising a container, a partition slidable endwise into and out of the container, and a signal mechanism carried by the partition.

2. A fishing float comprising a container, a partition freely insertible in and removable from the container, a circuit closer mounted on the partition, a lamp mounted on the partition in contact with the circuit closer, and a battery suspended on the partition and normally free of said circuit closer but swingable into engagement with the circuit closer upon turning of the container.

3. A fishing float comprising a container, a partition therein, a bracket of conducting material secured upon the partition adjacent the upper end thereof, a lamp mounted through said bracket and the partition, a circuit closer mounted on the partition and in engagement with one terminal of the lamp and having an element projecting through the partition, a suspending device of conducting material mounted on the bracket, and a battery carried by said conducting device and having one end in electrical contact therewith and its opposite end insulated therefrom, the battery being normally away from the circuit closer and adapted to swing toward the circuit closer to make contact therewith when the container is turned.

4. A fishing float comprising a cylindrical container, an insulating plate extending longitudinally of the container, a signal mechanism carried by said plate and including a battery suspended to swing to and from the plate and a contact on the plate, and a line-attaching element on the exterior of the container at the side remote from the battery whereby the battery will normally hang away from the plate and will swing to the plate and activate the signal when a pull on the line-attaching element rocks the container.

In testimony whereof I affix my signature.

CECIL E. GOOD. [L. S.]